United States Patent Office

2,903,474
Patented Sept. 8, 1959

2,903,474

PRODUCTION OF SPIRO HETEROCYCLIC PHOSPHORUS-CONTAINING COMPOUNDS

William M. Lanham, Charleston, W. Va., assignor to Union Carbide Corporation, a corporation of New York No Drawing. Application July 29, 1954
Serial No. 446,649

19 Claims. (Cl. 260—461)

This invention relates to a class of novel spiro heterocyclic phosphorus- and halogen-containing compounds, and to a process for their production.

More especially it concerns the production of novel spiro phosphorus- and halogen-containing compounds having structures corresponding to the formula:

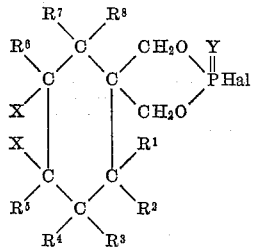

wherein $R^1$, $R^2$, $R^3$, $R^4$, $R^5$, $R^6$, $R^7$ and $R^8$, respectively, designates a radical of the class consisting of hydrogen, the halogens, and the alkyl and aryl radicals; X designates hydrogen or the two X's taken collectively represent a second bond between the adjacent carbon atoms; Y designates a radical of the class consisting of oxygen and sulfur; and Hal designates a halogen.

The novel compounds of this invention have utility as intermediates for the preparation of neutral esters of phosphoric acid. They react with alcohols, phenols, amines, alkali metal salts of alcohols and phenols, and ammonia to yield neutral compounds having potential utility as pesticides, plasticizers for synthetic resins, hydraulic fluids, lubricants, oil and gasoline additives, etc. The novel compounds can be converted to monobasic substituted phosphoric acids by a carefully controlled hydrolysis, and can be used to prepare the corresponding pyrophosphate esters.

According to the present invention these novel compounds are made by reacting a phosphoryl or thiophosphoryl halide, such as phosphoryl chloride or its thiono analogue, thiophosphoryl chloride, or the corresponding bromides or fluorides, with an 1,3-diol which consists of two methylol groups directly connected to the same carbon atom of either a cyclohexene or cyclohexane ring. Thus the diols useful as starting materials have structures represented by the formula:

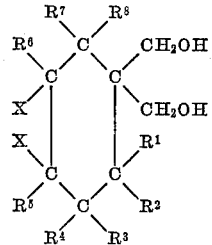

wherein $R^1$, $R^2$, $R^3$, $R^4$, $R^5$, $R^6$, $R^7$, $R^8$ and X have the designations hereinbefore indicated.

While stoichiometric proportions of the two reactants are required, as illustrated by the following simplified equation:

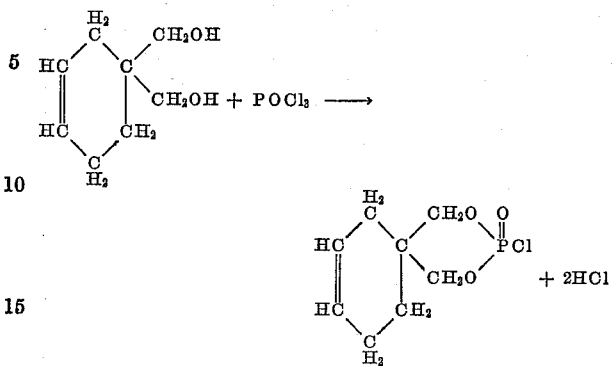

and the use of these proportions of reactants is preferred, an excess of either reactant can also be employed. Although the reaction conveniently is conducted in the presence of an inert solvent for the final product, a solvent is not necessary where the product is a liquid.

When using phosphoryl chloride as a reactant it is preferable to add one of the reactants, usually the phosphoryl chloride, in small successive amounts to an agitated suspension or solution of the other reactant in an inert solvent for the final product. While preferably the addition is made at around 25° C. under vacuum, the addition can be made under atmospheric pressure and the pressure subsequently reduced to remove by-product hydrogen chloride. Temperatures within the range from around −10° C. to around +60° C. or more can be used, though temperatures around 25° C. provide optimum results.

Where an inert solvent is used, any solvent that is substantially free from water can be used. Among suitable solvents are benzene, toluene, the xylenes, ethylene dichloride, heptane, hexane, ethyl ether, butyl ether, and the like. The resultant products are of high purity and are obtained in extremely high yields when an equimolar ratio of the reactants is used.

When thiophosphoryl chloride is used as one of the reactants it is preferred to conduct the reaction in the presence of a hydrogen chloride acceptor or sequestering agent such as a tertiary amine—e.g. pyridine or dimethylaniline, and in the presence of an inert solvent. In that modification of the process the reaction mixture is washed with water to remove the last traces of the amine hydrochloride. Preferably the water treatment is preceded by a treatment with a dilute aqueous alkali metal bicarbonate solution.

The reaction, which may be illustrated by the simplified equation

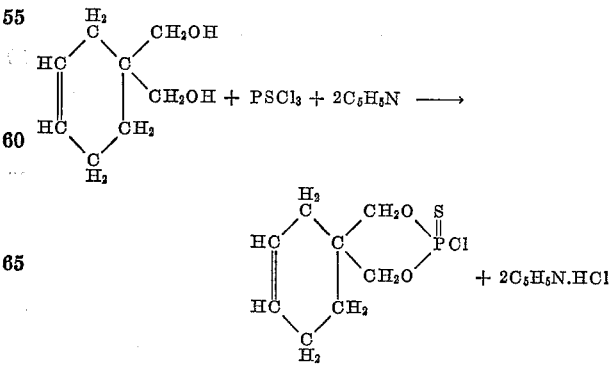

is preferably conducted at temperatures around 35°–45° C. although temperatures within the range between around 10° C. and around 120° C. can be used.

In this modification an inert diluent for the reactants and reaction products, such as ethylene dichloride and the benzenoid hydrocarbons, is required because of the presence in the reaction mixture of the hydrochloride derivative of the sequestering agent. The preferred practice is to add the thiophosphoryl chloride dropwise to an agitated solution of the diol and sequestering agent in ethylene dichloride or in a benzenoid hydrocarbon. If desired the diol can be added to the solution of thiophosphoryl chloride, sequestering agent and solvent. Equimolar proportions of the diol and the phosphorus compound preferably are used, but an excess of either of these reactants can be employed.

The desired residue products are secured in suitable manner as by filtering the reaction mixture, the filtrate washed successively with dilute aqueous alkali metal bicarbonate and with water, dried, and the dried products are stripped by distillation under vacuum.

The product can be purified by diluting it with ethyl ether, cooled to about −25° C. or below and filtered. The resultant crystals can be further stripped of any impurities by vacuum distillation at temperatures around 25° C.

The following examples serve to illustrate the invention.

Example 1

To an agitated solution of 158 grams (2 mols) of pyridine, 142 grams (1 mol) of 3-cyclohexene-1,1-dimethanol and 1000 cc. of ethylene dichloride there were added during 25 minutes dropwise 169 grams (1 mol) of thiophosphoryl chloride while cooling to maintain a reaction temperature of 40° C. After stirring the reaction mixture for one hour at 25° C., allowing it to stand overnight at 25° C. and heating for 2 hours at 40° C., it was cooled to 25° C. and filtered. The filtrate was washed with water and stripped by vacuum distillation at 55° C. and less than 2 mm. pressure to remove the ethylene dichloride and last traces of water. The resultant residue product was dissolved in 1000 cc. of ethyl ether, washed with 200 cc. of 10% aqueous sodium bicarbonate, washed with water, dried at 25° C. over calcium sulfate, and filtered. The filtrate was cooled to −40° C. and filtered. The crystals thus obtained were stripped by distillation at 25° C. under less than 15 mm. pressure. There was obtained 153 grams of spiro[(2-chloro-2-thiono-1,3,2-dioxaphosphorinane) - 5,4' - cyclohexene] in the form of a white solid having the following properties: Percent purity (by esterification)=97.9; melting point= 86°–89° C.

|    | Analysis, percent by weight ||
|    | Found | Theory |
| Cl | 14.27 | 14.86 |
| P  | 13.37 | 12.98 |
| C  | 39.22 | 40.29 |
| H  | 5.20  | 5.07  |
| S  | 12.90 | 13.43 |

A yield of 64%, based upon the phosphorous-containing reactant, was secured.

Example 2

To an agitated suspension of 71 grams (0.5 mol) of 3-cyclohexene-1,1-dimethanol in 480 cc. of ethylene dichloride there were added dropwise during 30 minutes 76.5 grams (0.5 mol) of phosphoryl chloride while maintaining the reaction mixture under an absolute pressure of 500 mm. of mercury at 25° C. Thereafter the reaction mixture was maintained at 25° C. under 500 mm. of mercury pressure for one hour, then at this temperature under 350 mm. of mercury for an hour, and finally at 50° C. under a pressure of less than 2 mm. of mercury for 30 minutes. The residual spiro[(2-chloro-2-oxo-1,3,2-dioxaphosphorinane)-5,4'-cyclohexene] was obtained as a white solid residue having an equivalent weight (by saponification) of 107.4 (theory=111.3), and a melting point of 94–97° C. The product analyzed, in percent by weight, 15.24% of the Cl (theory=15.93); Percent of P=14.11 (theory=1392).

Example 3

To an agitated suspension of 144 grams (1 mol) of cyclohexane-1,1-dimethanol in 960 cc. of ethylene dichloride there were added dropwise during 30 minutes 153 grams (1 mol) of phosphoryl chloride while maintaining the temperature at 25° C. with cooling; and while maintaining the mixture under an absolute pressure of 500 mm. of mercury. Thereafter, the reaction mixture was maintained under vacuum ranging from 500 mm. of mercury at 25° C. to less than 2 mm. of mercury at 50° C. and there was obtained spiro[(2-chloro-2-oxo-1,3,2-dioxaphosphorinane)-5,1'-cyclohexane] as a white solid product in 98% yield; it had a melting point of 121°–125°C.; a percent purity (by saponification) of 98.6; and the following analysis:

|    | Analysis, percent by weight ||
|    | Found | Theory |
| Cl | 15.08 | 15.78 |
| P  | 14.13 | 13.80 |
| C  | 42.78 | 42.81 |
| H  | 6.41  | 6.28  |

Example 4

To an agitated solution of 144 grams (1 mol) of cyclohexane-1,1-dimethanol, 169 grams (2.14 mols) of pyridine and 1000 cc. of ethylene dichloride there were added dropwise during 25 minutes 169 grams (1 mol) of thiophosphoryl chloride while maintaining a reaction temperature of 40° C. and for an additional 1.5 hours. After standing overnight at 25° C. the reaction mixture was cooled to 10° C. and filtered. The filtrate was washed with dilute aqueous sodium bicarbonate, washed with water, dried at 25° C. over calcium sulfate, and stripped by distillation to a kettle temperature of 30° C. under less than 25 mm. of mercury pressure. The resultant residue was diluted with 100 cc. of ethyl ether, cooled to −25° C. and filtered. The crystals thus obtained were stripped by distillation to a temperature of 25° C. under less than 20 mm. of mercury pressure giving a 70% yield of spiro [(2-chloro-2-thiono-1,3,2-dioxaphosphorinane) - 5,1'-cyclohexane] in the form of a white solid residue having a percent purity of 98.6 (by esterification), and the following analysis:

|    | Analysis, percent by weight ||
|    | Found | Theory |
| Cl | 14.66 | 14.74 |
| P  | 13.10 | 12.87 |
| C  | 40.20 | 39.94 |
| H  | 5.90  | 5.86  |
| S  | 13.0  | 13.32 |

Example 5

To an agitated solution of 0.5 mol of thiophosphoryl chloride, one mol of pyridine and 500 cc. of benzene, there were added during 15 minutes 0.5 mol of 6-methyl-3-cyclo-hexene-1,1-dimethanol at a reaction temperature of 40° C. The reaction mixture was maintained for an additional hour at 40° C., and after standing overnight at 25° C. was filtered. The filtrate was washed once with a 9% aqueous solution of sodium bicarbonate, washed once with water, dried at 25° C. over calcium sulfate, filtered, and the filtrate stripped by distillation to a kettle temperature of 50° C. under less than 0.5 mm. pressure.

The resultant spiro[(2-chloro-2-thiono-1,3, 2-dioxaphosphorinane)-5,5'-(4'-methylcyclohexene)] was obtained in 82% yield in the form of a white solid having a melting point of 51°–57° C., percent purity of 96.8% (by esterification); and the following analysis:

| | Analysis, percent by weight | |
|---|---|---|
| | Found | Theory |
| Cl | 13.60 | 14.03 |
| P | 12.43 | 12.65 |
| O | 43.34 | 42.78 |
| H | 5.85 | 5.58 |
| S | 12.25 | 12.68 |

*Example 6*

To an agitated solution of 0.7 mol of pyridine, 0.33 mol of thiophosphoryl chloride and 300 cc. of benzene maintained at 40° C., there were added dropwise during 25 minutes 0.33 mol of 2,4,6-trimethyl-3-cyclohexene-1,1-dimethanol with cooling. After an additional hour at 40° C., the reaction mixture was cooled to 10° C. and filtered. The filtrate was washed once with dilute aqueous sodium bicarbonate solution, washed with water, dried at 25° C. over calcium sulfate, filtered, and the filtrate stripped by distillation to a kettle temperature of 50° C. under less than 3 mm. of mercury pressure. The residual white solid product was purified by crystallization from ethyl ether, and then was freed of ether by distillation at 25° C. under less than 1 mm. of mercury pressure, thereby providing 34 grams of spiro[(2-chloro-2-thiono-1,3,2-dioxaphosphorinane)-5,4'-(1',3',5'-trimethylcyclohexene)] as a white solid having a melting point of 77°–79° C. and the following analysis:

| | Analysis, percent by weight | |
|---|---|---|
| | Found | Theory |
| Cl | 12.55 | 12.64 |
| P | 11.13 | 11.04 |
| O | 47.40 | 47.09 |
| H | 6.52 | 6.46 |
| S | 11.10 | 11.42 |

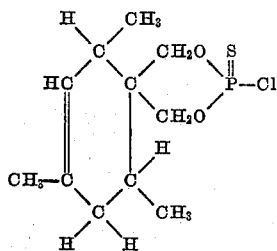

*Example 7*

To 0.185 mol of phosphoryl chloride there were added with agitation dropwise during 15 minutes 0.185 mol of 2,4,6-trimethyl-3-cyclohexene-1,1-dimethanol while maintaining the reaction mixture at 25° C. Thereafter the reaction mixture was maintained under vacuum ranging from 500 mm. of mercury at 25° C. to less than 3 mm. of mercury at that temperature thereby yielding 47.5 grams (theory=49 grams) of spiro[(2-chloro-2-oxo-1,3,2-dioxaphosphorinane)-5,4'-(1',3',5'-trimethylcyclohexene)] as a green viscous liquid residue having a purity of 91.8% (by saponification); and $n_D^{30}=1.4975$.

*Example 8*

To an agitated suspension of 88 grams (0.5 mol) of 4-chloro-3-cyclohexene-1,1-dimethanol in 300 grams of benzene maintained at 40° C. under an absolute pressure of 500 mm. of mercury were added dropwise during 30 minutes 76.5 grams (0.5 mol) of phosphoryl chloride. Thereafter the mixture was maintained for an hour at 40° C. under 500 mm. pressure, then for an hour at 25° C. under 350 mm. pressure, and finally for two hours at 40° C. under less than 1 mm. pressure, thereby yielding 127.5 grams (theory=128.5 grams) of spiro[(2-chloro-2-oxo-1,3,2-dioxaphosphorinane)-5,4'-(1'-chlorocyclohexene)] as a light tan solid residue melting at 99°–118° C., and having a purity (by saponification) of 99.8%; and a phosphorus content of 12.07% by weight (theory=12.04%); and a carbon content of 38.39%, by weight (theory=37.37%).

The 1,3-diol starting materials can be made by well known processes, as by a Diels Alder reaction between a conjugated diene and an alpha, beta-unsaturated aldehyde, followed by the reaction of the resultant aldehyde product with formaldehyde. Thus the reaction of equimolar amounts of butadiene-1,3 and acrolein yields 3-cyclohexene-1-carboxaldehyde. The latter reacts with formaldehyde and aqueous caustic soda in a 1:2:1 molar ratio to yield 3-cyclohexene-1,1-dimethanol. Catalytic hydrogenation of the latter yields the corresponding cyclohexane-1,1-dimethanol. Similarly, the use of butadiene-1,3 and crotonaldehyde in the Diels Alder reaction, followed by the treatment with formaldehyde and alkali yields 6-methyl-3-cyclohexene-1,1-dimethanol. The use of 1-phenylbutadiene-1,3 and acrolein in the same reaction, followed by the treatment with formaldehyde and alkali yields 2-phenyl-3-cyclohexene-1,1-dimethanol; and the corresponding reaction of chloroprene and acrolein followed by the formaldehyde and alkali treatment yields 4-chloro-3-cyclohexene-1,1-dimethanol. By employing various conjugated dienes and alpha, beta-unsaturated aldehydes a large variety of 1,3-diols can be prepared. For example, 2-methyl-1,3-pentadiene, crotonaldehyde and formaldehyde yield 2,4,6-trimethyl-3-cyclohexene-1,1-dimethanol. Starting with isoprene and crotonaldehyde, 4,6-dimethyl-3-cyclohexene-1,1-dimethanol is produced. The 4-chloro-6-methyl-3-cyclohexene-1,1-dimethanol is made when starting with chloroprene and crotonaldehyde.

Diols-1,3 of this type, and their corresponding substituted cyclohexane diol derivatives, are useful in the process. Thus, the reaction of phosphoryl chloride with the following diols in accordance with the process of the invention yield the spiro compounds designated:

| Dimethanol derivatives | Resultant products |
|---|---|
| 1. 2-phenyl-3-cyclohexene-1,1-dimethanol. | Spiro[(2-chloro-2-oxo-1,3,2-dioxaphosphorinane)-5,4'-(3-phenylcyclohexene)]. |
| 2. 2-methyl-2-phenyl-3-cyclohexene-1,1-dimethanol. | Spiro[(2-chloro-2-oxo-1,3,2-dioxaphosphorinane)-5,4'-(3'-methyl-3'-phenylcyclohexene)]. |
| 3. 3-chloro-6-methyl-3-cyclohexene-1,1-dimethanol. | Spiro[(2-chloro-2-oxo-1,3,2-dioxaphosphorinane)-5,5'-(1'-chloro-4'-methylcyclohexene)]. |
| 4. 2,5-diphenyl-6-methyl-3-cyclohexene-1,1-dimethanol. | Spiro[(2-chloro-2-oxo-1,3,2-dioxaphosphorinane)-5,5'-(3',6'-diphenyl-4'-methylcyclohexene)]. |

The invention is susceptible of modification within the scope of the appended claims.

I claim:

1. As new compounds, spiro heterocyclic phosphorus-containing halides having structures corresponding to the formula:

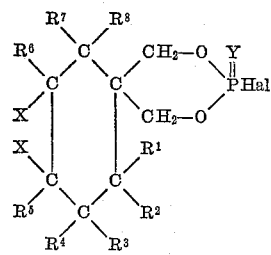

wherein $R^1$, $R^2$, $R^3$, $R^4$, $R^5$, $R^6$, $R^7$ and $R^8$, respectively, designates a radical of the class consisting of hydrogen, the halogens, and the lower alkyl and monocyclic aryl hydrocarbyl radicals; each X designates hydrogen and the two X's collectively represent a second bond between the adjacent carbon atoms; Y designates a radical of the class consisting of oxygen and sulfur; and Hal designates a halogen.

2. As new compounds, the spiro[(2-halo-2-oxo-1,3,2-dioxaphosphorinane)-5,4'-cyclohexenes].

3. As new compounds, the spiro[(2-halo-2-thiono-1,3,2-dioxaphosphorinane)-5,4'-cyclohexenes].

4. As new compounds, the spiro[(2-halo-2-oxo-,1,3,2-dioxaphosphorinane)-5,4'-cyclohexenes] substituted on at least one carbon atom of the cyclohexene ring by a lower alkyl group.

5. As new compounds, the spiro[(2-halo-2-thiono-1,3,2-dioxaphosphorinane)-5,4'-cyclohexenes] substituted on at least one carbon atom of the cyclohexene ring by a lower alkyl group.

6. As new compounds, the spiro[(2-halo-2-oxo-1,3,2-dioxaphosphorinane)-5,1'-cyclohexanes].

7. As new compounds, the spiro[(2-halo-2-thiono-1,3,2-dioxaphosphorinane)-5,1'-cyclohexanes].

8. As new compounds, the spiro[(2-halo-2-oxo-1,3,2-dioxaphosphorinane)-5,1'-cyclohexanes] substituted on at least one carbon atom of the cyclohexane ring by a lower alkyl group.

9. As new compounds, the spiro[(2-halo-2-thiono-1,3,2-dioxaphosphorinane)-5,1'-cyclohexanes] substituted on at least one carbon atom of the cyclohexane ring by a lower alkyl group.

10. Process for preparing spiro heterocyclic phosphorus-containing halides having the structure:

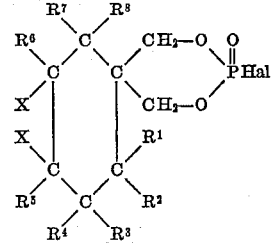

wherein $R^1$, $R^2$, $R^3$, $R^4$, $R^5$, $R^6$, $R^7$ and $R^8$, respectively, designates a radical of the class consisting of hydrogen, the halogens, and the lower alkyl and monocyclic aryl hydrocarbyl radicals; each X designates hydrogen, and two X's collectively represent a second bond between the adjacent carbon atoms; Y designates a radical of the class consisting of oxygen and sulfur; and Hal designates a halogen; which process comprises reacting a phosphorus compound of the class consisting of the phosphoryl halides and the thiophosphoryl halides with a 1,3-diol having a structure corresponding to the formula:

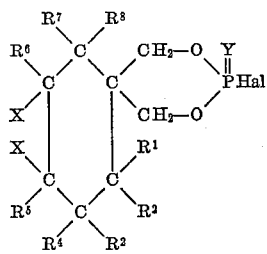

wherein $R^1$, $R^2$, $R^3$, $R^4$, $R^5$, $R^6$, $R^7$, $R^8$ and X have the aforesaid meanings.

11. Process as defined in claim 10 wherein one of the reactants is fed in small successive amounts to a liquid body containing the other of said reactants.

12. Process as defined in claim 10 wherein one of the reactants is fed in small successive amounts to a liquid body containing the other of said reactants and an inert solvent for the spiro product.

13. Process for producing spiro heterocyclic phosphorus-containing halides having the structure:

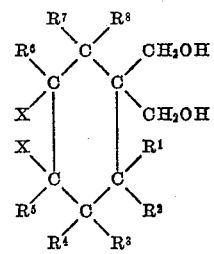

wherein $R^1$, $R^2$, $R^3$, $R^4$, $R^5$, $R^6$, $R^7$ and $R^8$, respectively, designates a radical of the class consisting of hydrogen, the halogens, and the lower alkyl and monocyclic aryl hydrocarbyl radicals; each X designates hydrogen and two X's collectively represent a second bond between the adjacent carbon atoms; and Hal designates a halogen; which process comprises reacting a phosphoryl halide with a 1,3-diol having a structure corresponding to the formula:

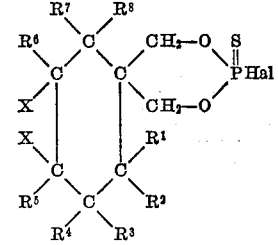

wherein $R^1$, $R^2$, $R^3$, $R^4$, $R^5$, $R^6$, $R^7$, $R^8$ and X have the aforesaid meanings, at temperatures in the range from about —10° C. to about 60° C., and removing by-product hydrogen halide formed.

14. Process for preparing spiro heterocyclic phosphorus-containing halides having the structure:

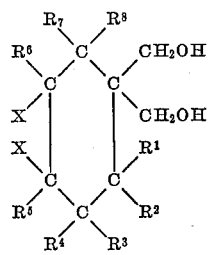

wherein $R^1$, $R^2$, $R^3$, $R^4$, $R^5$, $R^6$, $R^7$ and $R^8$, respectively, designates a radical of the class consisting of hydrogen, the halogens, and the lower alkyl and monocyclic aryl hydrocarbyl radicals; each X designates hydrogen, and two X's collectively represent a second bond between the adjacent carbon atoms; and Hal designates a halogen; which comprises reacting a thiophosphoryl halide with a 1,3-diol having a structure corresponding to the formula:

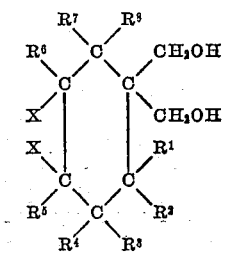

wherein $R^1$, $R^2$, $R^3$, $R^4$, $R^5$, $R^6$, $R^7$, $R^8$ and X have the aforesaid meanings, at temperatures in the range from around 10° C. to around 120° C. in the presence of a hydrogen halide sequestering agent and a volatile solvent for the spiro reaction product, separating the halogen halide salt of said sequestering agent from the reaction mixture, and recovering from the residual mixture the said spiro product present therein.

15. As a new compound, spiro[(2-chloro-2-oxo-1,3,2-dioxaphosphorinane)-5,4'-cyclohexene].

16. As a new compound, spiro[(2-chloro-2-thiono-1,3,2-dioxaphosphorinane)-5,5'-(4'-methylcyclohexane)].

17. As a new compound, spiro[(2-chloro-2-thiono-1,3,2-dioxaphosphorinane)-5,4'-cyclohexene].

18. As a new compound, spiro[(2-chloro-2-oxo-1,3,2-dioxaphosphorinane)-5,1'-cyclohexane].

19. As a new compound, spiro[(2-chloro-2-oxo-1,3,2-dioxaphosphorinane) - 5,4' - (1',3',5'-trimethylcyclohexene)].

References Cited in the file of this patent

UNITED STATES PATENTS 2,661,365    Gamrath et al. _____ Dec. 1, 1953

OTHER REFERENCES

French et al.: "Journal of The American Chemical Society," vol. 64, pp. 1497–9 (1942).